United States Patent
Kessler (10) Patent No.: US 8,348,455 B2
(45) Date of Patent: Jan. 8, 2013

(54) OVERHEAD READING LAMP FOR A PASSENGER SEAT

(75) Inventor: Jens Kessler, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/125,250

(22) PCT Filed: Nov. 2, 2009

(86) PCT No.: PCT/EP2009/007836
§ 371 (c)(1),
(2), (4) Date: Jun. 16, 2011

(87) PCT Pub. No.: WO2010/051957
PCT Pub. Date: May 14, 2010

(65) Prior Publication Data
US 2011/0235350 A1    Sep. 29, 2011

Related U.S. Application Data

(63) Continuation of application No. PCT/EP2009/007836, filed on Nov. 2, 2009.

(60) Provisional application No. 61/111,101, filed on Nov. 4, 2008.

(30) Foreign Application Priority Data

Nov. 4, 2008    (DE) .......................... 10 2008 055 812

(51) Int. Cl.
*F21V 21/00* (2006.01)

(52) U.S. Cl. .................... 362/227; 362/249.01

(58) Field of Classification Search .................. 362/471, 362/802, 470, 339, 231, 241, 246, 240, 331, 362/277, 319; 340/686.1, 945
See application file for complete search history.

(56) References Cited

U.S. PATENT DOCUMENTS

| 2002/0181231 | A1* | 12/2002 | Luk ............................... 362/240 |
| 2005/0265029 | A1* | 12/2005 | Epstein et al. ................ 362/339 |
| 2006/0261970 | A1 | 11/2006 | Colacecchi |

FOREIGN PATENT DOCUMENTS

| DE | 20317860 | 2/2004 |
| DE | 602090238 | 11/2006 |

(Continued)

OTHER PUBLICATIONS

European Patent Office, International Search Report, Form PCT/ISA/210 (4 pgs.), Form PCT/ISA/220 (3 pgs.), and Form PCT/ISA/237 (6 pgs.), Jul. 1, 2010.

*Primary Examiner* — Anh Mai
*Assistant Examiner* — Elmito Breval
(74) *Attorney, Agent, or Firm* — Wood, Herron & Evans, LLP (57) ABSTRACT

An overhead reading lamp for a passenger seat, in particular in an aircraft cabin, includes a first plurality of light sources, each of which emits light along a center line. The lamp also includes, a holding device which immovably secures the first plurality of light sources so as to be disposed in a first row in such a way that the center lines of the light sources of the first plurality of light sources lie in one plane and are inclined relative to one another. The lamp further includes an, and an activation device, which is connected to the first plurality of light sources and devised to selectively activate in each case one of the light sources of the first plurality of light sources.

11 Claims, 6 Drawing Sheets

FOREIGN PATENT DOCUMENTS

| | | |
|---|---|---|
| DE | 102006027549 | 12/2007 |
| DE | 102006048711 | 4/2008 |
| WO | 2004039631 | 5/2004 |
| WO | 2006018219 | 2/2006 |

* cited by examiner

OVERHEAD READING LAMP FOR A PASSENGER SEAT

This application claims priority to PCT Application No. PCT/EP2009/007836, filed on Nov. 2, 2009, under Section 371 and/or as a continuation under Section 120, which claims priority to German Application No. 10 2008 055 812.5 and U.S. Provisional Application No. 61/111,101, both filed on Nov. 4, 2008.

TECHNICAL FIELD

The invention relates to an overhead reading lamp for a passenger seat comprising a first plurality of light sources, a holding device for holding the first plurality of light sources and an activation device for activating the first plurality of light sources.

BACKGROUND

An overhead reading lamp for a passenger seat in an aircraft cabin that is integrated into a passenger service unit is prior art. The passenger service unit comprises, in addition to the overhead reading lamp, a display unit for "fasten seat belt" and "no smoking" symbols, a blower outlet opening and a call button for flight personnel, wherein the overhead reading lamp comprises a light source, the alignment of which is adjustable by means of a tool. When passenger service units are installed in an aircraft cabin, they are fastened to the ceiling of the aircraft cabin and then, depending on the seating specifications of the airlines, the passenger seats are fastened at predefined positions to the floor of the aircraft cabin. Then, using the tool the light sources are manually aligned in such a way that they illuminate predetermined areas of the respective passenger seats. This alignment of the light sources is however time-consuming, especially in aircraft that have a large number of passenger seats.

Increasingly in aircraft cabins passenger seats are being fitted, which may be moved and/or displaced forward and backward in sitting direction. Furthermore, particularly in first class there are passenger seats that may be displaced and/or rotated to the left and to the right in sitting direction. The drawback of the displacement and/or rotation of these passenger seats is however that the alignment of the overhead reading lamp does not adapt to an altered position of the passenger seat.

To solve this problem, overhead reading lamps are known, the alignment of which is manually adjustable. However, such a manual re-adjustment is awkward, particularly if as a result of the displacement and/or rotation of the passenger seat away from the overhead reading lamp the overhead reading lamp is no longer within reach of the passenger in the seated state and so the passenger has to get up from his seat to readjust the overhead reading lamp. In the non-seated state it is however difficult for him to estimate which alignment of the overhead reading lamp is appropriate, for example for reading a book, in the seated position.

The invention is geared to the object of providing an overhead reading lamp for a passenger seat, in particular in an aircraft cabin, that enables an easy and convenient adaptation of the alignment of the overhead reading lamp to the position of the passenger seat.

SUMMARY

For achieving this object an overhead reading lamp for a passenger seat, in particular in an aircraft cabin, is provided, comprising a first plurality of light sources, each of which emits light along a centre line, a holding device, which immovably secures the first plurality of light sources disposed in a first row in such a way that the centre lines of the light sources of the first plurality of light sources lie in a first plane and are inclined relative to one another, and an activation device, which is connected to the first plurality of light sources and devised to selectively activate in each case one of the light sources of the first plurality of light sources.

The overhead reading lamp according to the invention is notable for the fact that a passenger seat in different positions, in particular in the event of displacement of the passenger seat forward and/or backward or to the left and/or to the right in sitting direction, may be illuminated without requiring any mechanical adjustment of a light source because each of the plurality of light sources illuminates a slightly different area as a result of the centre lines being inclined relative to one another. This means that only the one, appropriate light source is activated in each case. According to the invention it is therefore possible to dispense with mechanical adjusting means for adjusting the alignment of the light sources, thereby saving weight and space, which particularly in the case of use of the overhead reading lamp in an aircraft cabin is advantageous. The light sources are preferably light-emitting diodes. Each of the light sources in this case may comprise additional elements such as reflectors and/or lenses. The holding device may be an integral plastic injection moulded part. The activation device triggers in each case only one of the light sources of the first plurality of light sources into lighting up. Because of the different alignment of the centre line axes in a common plane, in particular because each centre line lies at a different angle in the first plane, by activating various light sources different areas may be illuminated.

To enable a compact style of construction of the overhead reading lamp, the centre lines of in each case two adjacent light sources of the first plurality of light sources may be at equal distances from one another and all of the centre lines of the first plurality of light sources may intersect at one point. Preferably the centre lines of the light sources intersect at a point in the common first plane between the overhead reading lamp and the passenger seat, and the light emitted along the centre lines strikes the passenger seat downstream of the point of intersection. Thus, by selecting the position of the point of intersection, i.e. by selecting the angles, at which the centre lines of the light sources lie in the common plane, it is possible to influence the distances between adjacent centre lines at the projection area of the passenger seat. It is therefore possible to adapt the centre lines to possible adjustment positions of the passenger seat, so that a light source may be associated with each of the adjustment positions.

Alternatively, the distance between the centre lines of in each case two adjacent light sources may decrease outwards from a light source disposed in the middle of the first row, wherein once again all of the centre lines of the light sources of the first plurality of light sources intersect at one point. It is thereby possible to provide an illumination facility even to a passenger seat that has been displaced in a direction some way from a starting position, for example for landing or take-off of an aircraft.

In order to provide additional space between the overhead reading lamp and a passenger sitting on a passenger seat below it and to enable a compact style of construction of the overhead reading lamp, the first row, along which the first plurality of light sources is arranged, may have the shape of a first elliptical arc, the concave side of which faces in the direction of emission of the light sources. In particular, the concave side may face the passenger seat. In this case, the shape of the first elliptical arc also includes the special shape of a circular arc. By virtue of this arrangement of the light sources it is possible in particular to provide more free space above the head of the passenger, which makes the often cramped conditions of sitting in an aircraft cabin more pleasant.

In order to allow an adaptation of the alignment of the overhead reading lamp to the position of the passenger seat not only in the event of displacement of the passenger seat forward and backward in longitudinal direction but also in the event of displacement of the passenger seat to the left and to the right in transverse direction and/or rotation of the passenger seat, the overhead reading lamp may comprise a second plurality of light sources, each of which emits light along a centre line, wherein the holding device immovably secures the second plurality of light sources disposed in a second row in such a way that the centre lines of the light sources of the second plurality of light sources lie in a second plane and are inclined relative to one another and wherein the second row is parallel to the first row. In particular, each centre line of the light sources of the second plurality of light sources may lie at a different angle in the second plane. Thus, for example in the event of displacement of the passenger seat to the left or to the right in transverse direction, selective light sources of the second plurality of light sources may be activated in order correspondingly to illuminate a passenger seat that has been displaced to the left and/or to the right.

Preferably the light sources of the first and second plurality of light sources lie on an elliptical paraboloidal surface and the first and the second plane intersect. The shape of an elliptical paraboloid in this case also includes the special shape of a spherical segment. Thus, the first and the second row, along which the first and the second plurality of light sources are disposed, may be two parallel elliptical arcs. It is also conceivable for all of the centre lines of the first and second plurality of light sources to intersect at one point, wherein the point of intersection lies between the light sources and the passenger seat. This arrangement of the light sources provides not only an adaptability of the overhead reading lamp to a displacement of the passenger seat forward and back in longitudinal direction and to the left and to the right in transverse direction but also an overhead reading lamp of a compact style of construction, thereby making it possible to increase the free space between overhead reading lamp and a passenger sitting on the passenger seat.

In order that the light sources are directed in a uniform alignment and/or uniformly extending alignment towards the passenger seat, the holding device may hold the light sources of the first and second plurality of light sources in such a way on the elliptical paraboloidal surface that their centre lines extend at least substantially normal to the elliptical paraboloidal surface. As a result, the light exit surfaces of the light sources form substantially the shape of an elliptical paraboloid. If reflectors and/or lens are additionally fitted on the light sources, it is further possible to prevent edges of the reflector, on which a passenger might injure himself, from being directed towards the passenger seat.

In order to enable a convenient adaptation of the illumination provided by the overhead reading lamp to the position of the passenger seat, the activation device may be devised to selectively activate one of the light sources in dependence upon a position of the passenger seat. For example, a position detection device may be provided, which communicates signals corresponding to the positions of the passenger seat to the activation device. The activation device may in this case automatically activate an appropriate light source in dependence upon the position of the passenger seat. This makes it possible for the passenger seat to be automatically illuminated by the correct light source in any position.

In order to provide a large number of illumination capabilities of the overhead reading lamp for a displacement of the passenger seat forward, backward, to the left and to the right, in particular for a displacement of the passenger seat some way to the left and/or to the right from a starting position, the holding device may hold in each case a plurality of light sources on more than two parallel elliptical arcs of the elliptical paraboloidal surface, wherein the distances between two in each case adjacent elliptical arcs decrease outwards from an elliptical arc running through the vertex of the elliptical paraboloidal surface.

In order to provide a passenger sitting on the passenger seat with a pleasant light atmosphere, the overhead reading lamp may comprise a third plurality of light sources, each of which emits light along a centre line. In this case, the holding device immovably secures the third plurality of light sources disposed in a third row in such a way that the centre lines of the light sources of the third plurality of light sources lie in a third plane and are inclined relative to one another, wherein light sources of the first plurality of light sources emit light of a greater luminous intensity than the light sources of the third plurality of light sources and the activation device is devised to activate at least one of the light sources of the third plurality of light sources independently of the selective activation of a light source of the first plurality of light sources. Thus, the light sources of the third plurality of light sources may also emit light of different colour to the light sources of the first and/or second plurality of light sources. In this way a so-called "ambient light" is provided. It is also conceivable for the light sources of the third plurality of light sources to emit light of the colours red, green and blue, so that by additive red-, green-, blue-(RGB) colour mixing any desired ambient light colour may be produced. In particular, the light sources of the third plurality of light sources may be aligned in such a way that they illuminate an area on the passenger seat that lies alongside and/or partially overlaps an area that is illuminated by a light source used as reading light, in particular a light source of the first or second plurality of light sources.

In order to prevent light sources from protruding into the interior of the aircraft cabin, the overhead reading lamp at the light-emitting side of the lamp may comprise a cover, the outer surface of which at least partially emulates the shape of the first row, wherein the cover has a plurality of cutouts, in which the light sources of the first plurality of light sources are held by the holding device, and the light sources of the first plurality of light sources have light exit surfaces that are at least substantially flush with the outer surface of the cover. In this way it is possible to provide an overhead reading lamp with a smooth outer surface, which besides posing a low risk of injury to passengers is also easy to clean.

At the light-emitting side of the lamp the overhead reading lamp may also comprise an at least partially transparent cover, the outer surface of which at least partially emulates the shape of the first row, wherein the light sources of the first plurality of light sources emit light through the cover. In this form of implementation, only the outer surface the cover and the light source activated in each case are visible to the passenger. The transparent cover protects the light sources from being touched by passengers, thereby leading to a longer service life of the light sources. Also, the passengers cannot injure themselves on the light sources. The cover, as a result of being configured without openings, is moreover easier to clean.

The invention further relates to a passenger service unit, in particular for an aircraft cabin, comprising at least one overhead reading lamp according to the invention.

BRIEF DESCRIPTION OF THE DRAWINGS

There now follows a detailed description of preferred embodiments of the present invention with reference to the accompanying diagrammatic figures, of which.

DETAILED DESCRIPTION

Figure 1:
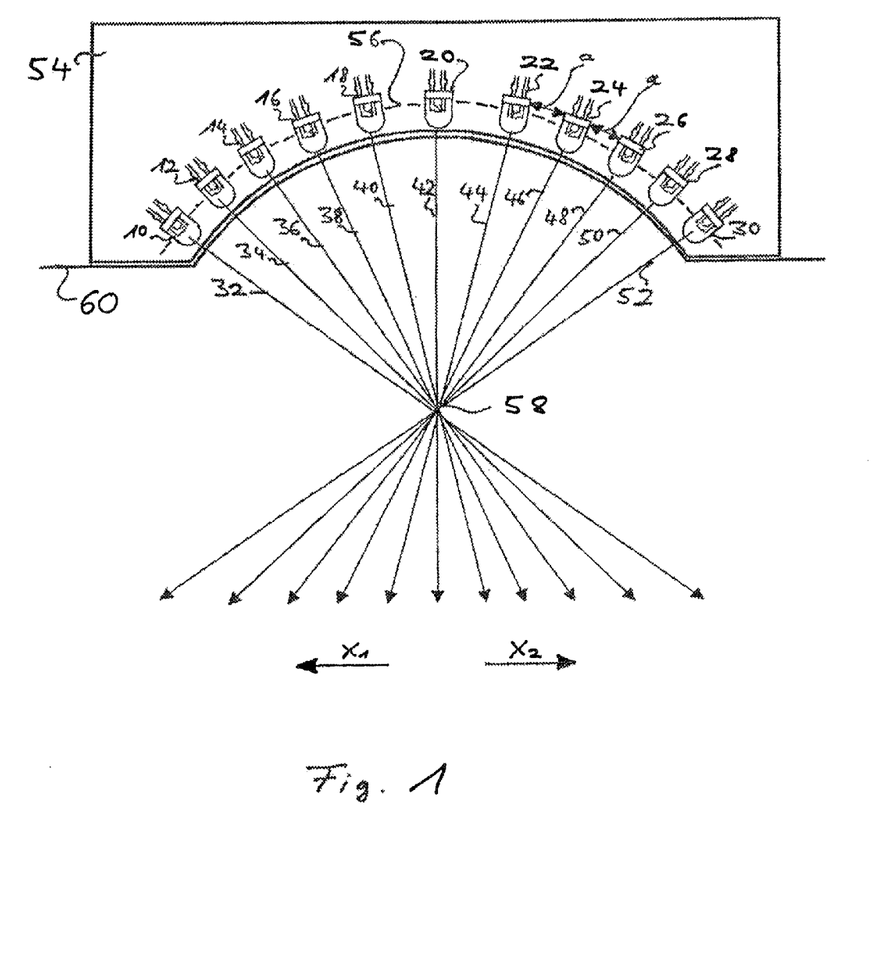
FIG. 1 shows a sectional side view of a first embodiment of an overhead reading lamp comprising a plurality of light-emitting diodes.

An overhead reading lamp, which is shown in FIG. 1 in a cutout manner in a sectional side view, comprises a plurality of light-emitting diodes 10, 12, 14, 16, 18, 20, 22, 24, 26, 28, 30, which emit light along centre lines 32, 34, 36, 38, 40, 42, 44, 46, 48, 50 and 52 into an interior of an aircraft cabin towards a passenger seat (not shown). A diagrammatically represented holding device secures the light-emitting diodes 10, 12, 14, 16, 18, 20, 22, 24, 26, 28, 30 in such an immovable manner that the centre lines 32, 34, 36, 38, 40, 42, 44, 46, 48, 50, 52 lie in a common plane. In the embodiment shown in FIG. 1 the common plane is the drawing plane. In particular, the holding device 54 holds the light-emitting diodes 10, 12, 14, 16, 18, 20, 22, 24, 26, 28, 30 in such a way that the centre lines 32, 34, 36, 38, 40, 42, 44, 46, 48, 50, 52 lie at different angles, i.e. with various alignments, in the common plane. In this case, the centre lines are inclined relative to one another and none of the centre lines 32, 34, 36, 38, 40, 42, 44, 46, 48, 50, 52 is aligned parallel to another centre line.

The holding device 54 holds the light-emitting diodes 10, 12, 14, 16, 18, 20, 22, 24, 26, 28, 30 in a row that has the shape of a circular arc 56. In particular, the holding device 54 holds the light-emitting diodes 10, 12, 14, 16, 18, 20, 22, 24, 26, 28, 30 in such a way on the circular arc 56 that the centre lines of in each case two adjacent light-emitting diodes of the plurality of light-emitting diodes 10, 12, 14, 16, 18, 20, 22, 24, 26, 28, 30 are at equal distances a from one another. The present invention is however not restricted to the shape of a circular arc. In principle, the row, along which the light-emitting diodes 10, 12, 14, 16, 18, 20, 22, 24, 26, 28, 30 are disposed, may have any shape, in particular the shape of a straight line.

The light-emitting diodes 10, 12, 14, 16, 18, 20, 22, 24, 26, 28, 30 are aligned in such a way on the circular arc 56 that their centre lines 32, 34, 36, 38, 40, 42, 44, 46, 48, 50, 52 are substantially normal to the convex side of the circular arc 56. The centre lines 32, 34, 36, 38, 40, 42, 44, 46, 48, 50, 52 intersect at a point of intersection 58, which lies between the overhead reading lamp and the passenger seat.

Disposed between the light-emitting diodes 10, 12, 14, 16, 18, 20, 22, 24, 26, 28, 30 and the point of intersection 58 is a partially transparent cover 60. The cover 60 in the region of the light-emitting diodes 10, 12, 14, 16, 18, 20, 22, 24, 26, 28, 30 emulates the shape of the circular arc 56. In the region of the light-emitting diodes 10, 12, 14, 16, 18, 20, 22, 24, 26, 28, 30 the cover 60 is of a transparent design. The light-emitting diodes 10, 12, 14, 16, 18, 20, 22, 24, 26, 28, 30 emit light through the transparent cover 60 into the interior of the aircraft cabin. By means of the cover 60 the plurality of light-emitting diodes 10, 12, 14, 16, 18, 20, 22, 24, 26, 28, 30 are disposed separate from the passengers, so that the passengers cannot accidentally touch and/or damage the light-emitting diodes 10, 12, 14, 16, 18, 20, 22, 24, 26, 28, 30. The transparent cover 60 moreover has no openings, thereby preventing dust or other pollutants from reaching the light-emitting diodes 10, 12, 14, 16, 18, 20, 22, 24, 26, 28, 30. The fact that the cover 60 is closed additionally simplifies cleaning thereof.

Figure 2:
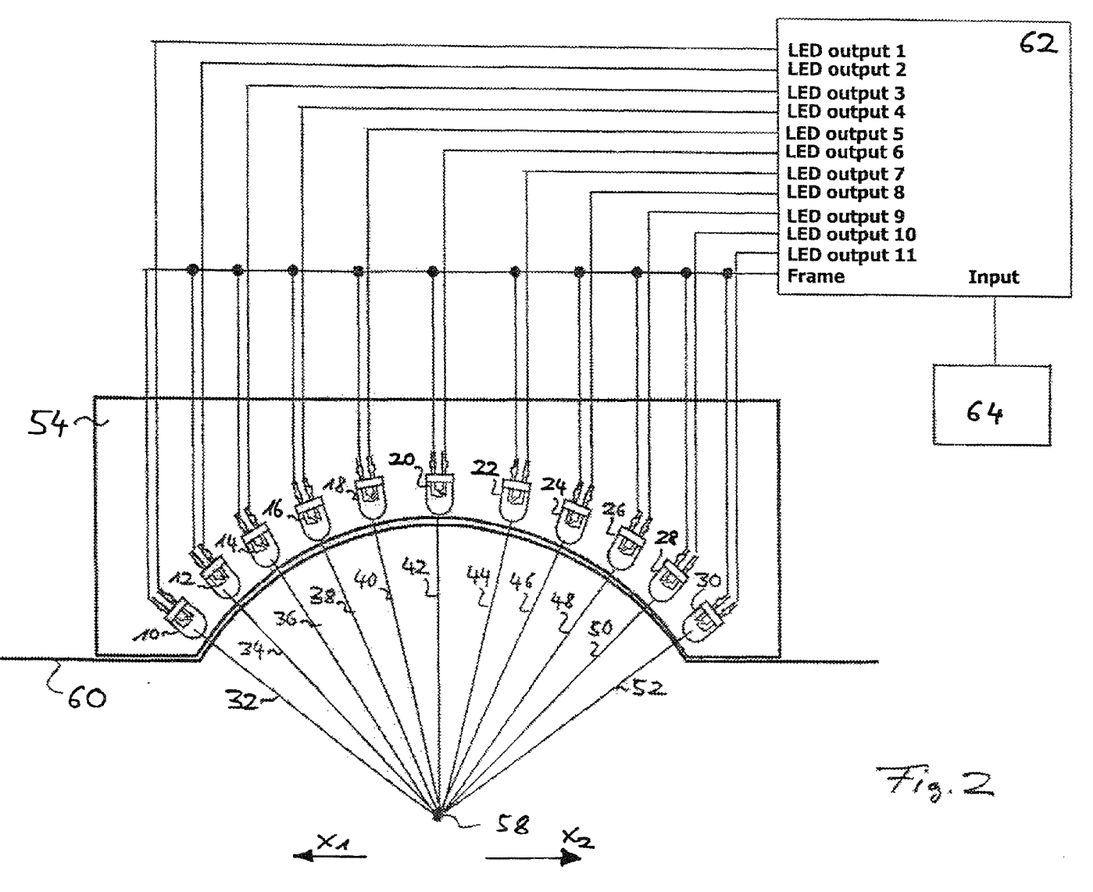
FIG. 2 shows a sectional side view of the overhead reading lamp of FIG. 1 with an electric activation device.

FIG. 2 shows the electrical activation of the light-emitting diodes 10, 12, 14, 16, 18, 20, 22, 24, 26, 28, 30 of the overhead reading lamp of FIG. 1. For the electrical activation an activation device 62 is provided. The activation device 62 comprises terminals for an input, a plurality of LED outputs 1 to 11 and a frame terminal. The input of the activation device 62 is connected to a power source 64 that supplies power to the light-emitting diodes 10, 12, 14, 16, 18, 20, 22, 24, 26, 28, 30. Each of the light-emitting diodes 10, 12, 14, 16, 18, 20, 22, 24, 26, 28, 30 has two terminal legs. One of the terminal legs is connected in each case to the frame terminal of the activation device 62 and the second terminal legs of the light-emitting diodes 10, 12, 14, 16, 18, 20, 22, 24, 26, 28, 30 are connected in each case to one of the LED outputs 1 to 11. The activation device 62 is devised to selectively activate one of the light-emitting diodes 10, 12, 14, 16, 18, 20, 22, 24, 26, 28, 30.

The overhead reading lamp is fitted centrally above a passenger seat (not shown). In a starting position of the passenger seat, for example for take-off and landing of the aircraft, the activation device 62 activates only the light-emitting diode 20, which emits light along the centre line 42 towards the passenger seat. If the passenger seat is then displaced in the direction $x_1$, the activation device 62 instead of the light-emitting diode 20 activates the light-emitting diode 22, which emits light along the centre line 44 towards the same area of the now displaced passenger seat. If the passenger seat is displaced further in the direction $x_1$, then in dependence upon the displacement travel in the direction $x_1$ the light-emitting diodes 24, 26, 28 or 30 may be selectively activated by the activation device 62. In the event of maximum displacement of the passenger seat in the direction $x_1$, the light-emitting diode 30 that emits light along the centre line 52 towards the passenger seat is activated by the activation device 62. In a corresponding manner, if the passenger seat is moved in the direction $x_2$, the light-emitting diodes 18, 16, 14, 12 or 10 are selectively activated by the activation device 52.

By virtue of the arrangement of the light-emitting diodes 10, 12, 14, 16, 18, 20, 22, 24, 26, 28, 30 on the circular arc 56 a compact style of construction of the overhead reading lamp is possible, wherein additional space is provided above a passenger sitting on the passenger seat.

Figure 3:
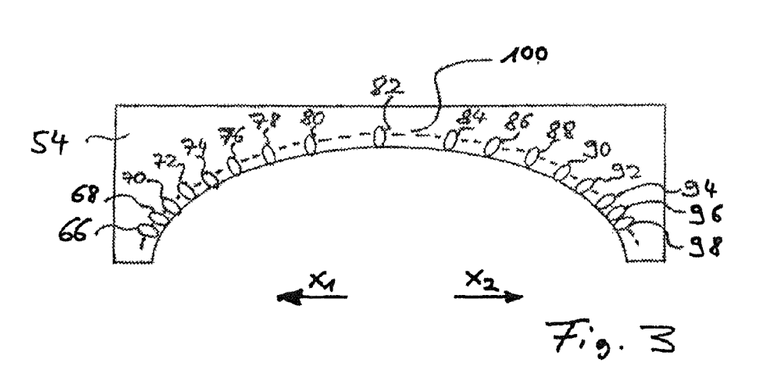
FIG. 3 shows a sectional side view of a second embodiment of an overhead reading lamp comprising a plurality of light-emitting diodes.

FIG. 3 shows a sectional side view of a second embodiment of an overhead reading lamp with a holding device 54, which immovably secures a plurality of light-emitting diodes 66, 68, 70, 72, 74, 76, 78, 80, 82, 84, 86, 88, 90, 92, 94, 96, 98.

The embodiment of FIG. 3 differs from the embodiment of FIGS. 1 and 2 in that the light-emitting diodes 66, 68, 70, 72, 74, 76, 78, 80, 82, 84, 86, 88, 90, 92, 94, 96, 98 are disposed along an elliptical arc 100 and the distances between two in each case adjacent light-emitting diodes decrease outwards from a light-emitting diode 82 disposed in the middle of the elliptical arc 100. The light-emitting diodes 66, 68, 70, 72, 74, 76, 78, 80, 82, 84, 86, 88, 90, 92, 94, 96, 98 emit light along respective centre lines (which are not shown in FIG. 3) towards a passenger seat (not shown) disposed under the light-emitting diodes 66, 68, 70, 72, 74, 76, 78, 80, 82, 84, 86, 88, 90, 92, 94, 96, 98.

Figure 4:
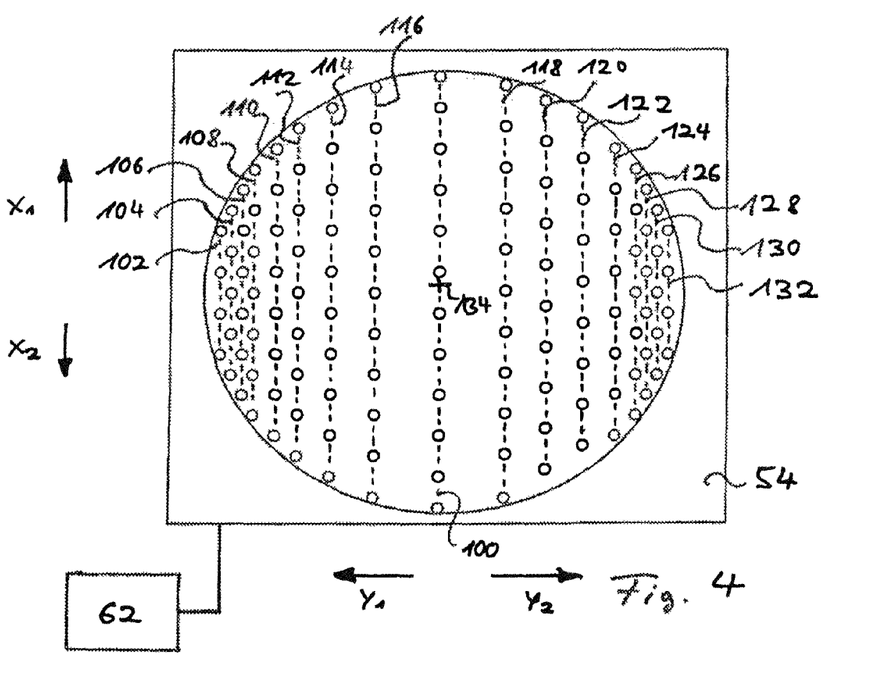
FIG. 4 shows an inverted plan view of the overhead reading lamp of FIG. 3.

FIG. 4 shows an inverted plan view of the overhead reading lamp of FIG. 3. As is evident from FIG. 4, the overhead reading lamp comprises, in addition to the light-emitting diodes 66, 68, 70, 72, 74, 76, 78, 80, 82, 84, 86, 88, 90, 92, 94, 96, 98 disposed along the elliptical arc 100, light-emitting diodes that are disposed along further elliptical arcs 102, 104, 106, 108, 110, 112, 114, 116, 118, 120, 122, 124, 126, 128, 130, 132. The elliptical arcs 100, 102, 104, 106, 108, 110, 112, 114, 116, 118, 120, 122, 124, 126, 128, 130, 132 are aligned parallel to one another. In particular, the elliptical arcs 100, 102, 104, 106, 108, 110, 112, 114, 116, 118, 120, 122, 124, 126, 128, 130, 132 and/or all of the light-emitting diodes lie on an elliptical paraboloidal surface (in FIG. 4 only the concave elliptical paraboloidal surface is visible). The distances between two in each case adjacent elliptical arcs 100, 102, 104, 106, 108, 110, 112, 114, 116, 118, 120, 122, 124, 126, 128, 130, 132 decrease outwards from the elliptical arc 100 running through the vertex 134 of the elliptical paraboloidal surface.

The light-emitting diodes disposed on the elliptical arcs 100, 102, 104, 106, 108, 110, 112, 114, 116, 118, 120, 122, 124, 126, 128, 130, 132 are aligned in such a way that their centre lines lie in each case in one plane. The planes intersect in a straight line (not shown). In particular, the planes are aligned in such a way that all of the centre lines of the light-emitting diodes intersect at a point of intersection above the passenger seat (not shown).

All of the light-emitting diodes are connected to the activation device 62, which is devised to selectively activate the light-emitting diodes. Thus, with the overhead reading lamp shown in FIGS. 3 and 4 an adaptation of the light emitted by the overhead reading lamp to the position of the passenger seat is possible in the event of displacement of the passenger seat in the directions $x_1$ and $x_2$, i.e. forward and backward in longitudinal direction, and in the directions $y_1$ and $y_2$, i.e. to the left and to the right in transverse direction.

If the passenger seat is displaced from a starting position (for example for take-off and landing of the aircraft), in which it is illuminated by the light-emitting diode 82, in the direction $x_1$, then instead of the light-emitting diode 82 the light-emitting diode 80 is activated by the activation device 62. In a corresponding manner, in the event of displacement of the passenger seat in the direction $x_2$, instead of the light-emitting diode 82 the light-emitting diode 84 is activated by the activation device 62. In the event of a further displacement of the passenger seat in the directions $x_1$ and/or $x_2$, light-emitting diodes disposed further out are activated by the activation device 62.

If the passenger seat is displaced in the direction $y_1$, then the activation device 162 correspondingly activates one of the light-emitting diodes disposed on the elliptical arcs 118, 120, 122, 124, 126, 128, 130 or 132. If, on the other hand, the passenger seat is displaced in the direction $y_2$, then the activation device 162 activates one of the light-emitting diodes disposed on the elliptical arcs 102, 104, 106, 108, 110, 112, 114 or 116.

The passenger seat comprises a detection device (not shown), which communicates a signal corresponding to the position of the passenger seat to the activation device 62. In dependence upon the position of the passenger seat the activation device 62 automatically activates the associated light-emitting diode, so that the passenger seat in any position, into which it has been displaced in the directions $x_1$, $x_2$, $y_1$ and $y_2$, is illuminated by the overhead reading lamp.

Figure 5:
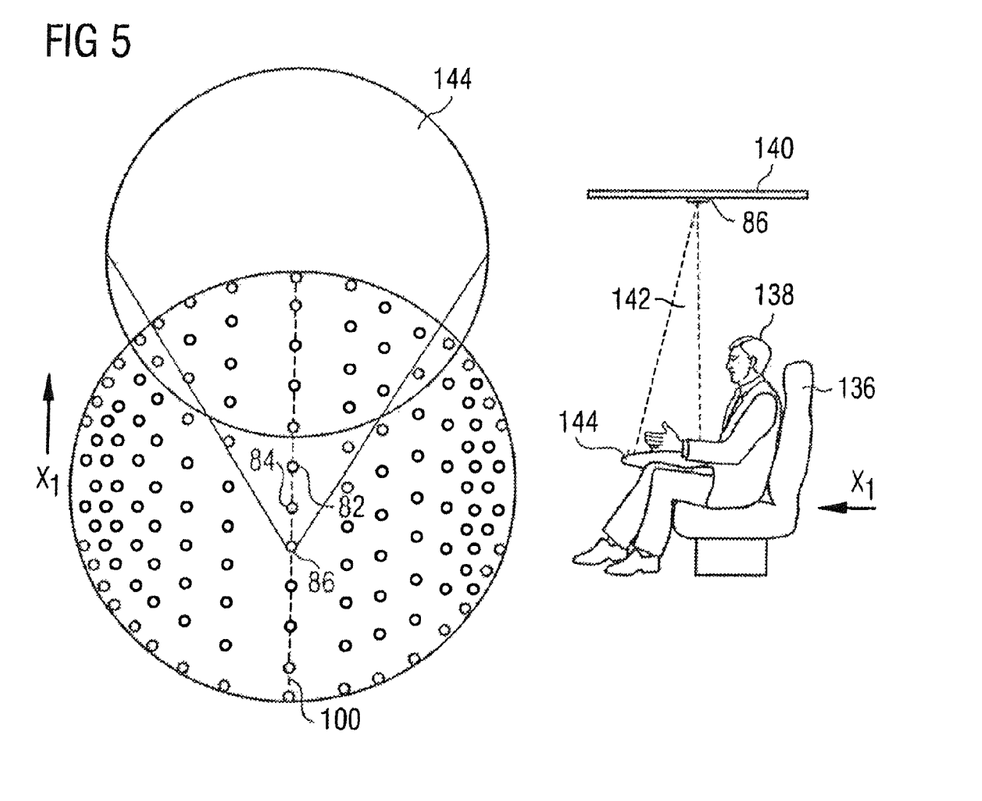
FIG. 5 shows the overhead reading lamp of FIG. 4 in the case of displacement of a passenger seat forward in sitting direction.

FIG. 5 shows the reading lamp of FIG. 4 and pictorializes a change of the activation of the light-emitting diodes upon displacement of a passenger seat 136.

A passenger 138 is situated on the passenger seat 136. The passenger seat 136 is displaced from a starting position (not shown) in the direction $x_1$, i.e. forward in sitting direction. In the starting position the passenger seat 136 was illuminated by the light-emitting diode 82. After the displacement of the passenger seat 136 in the direction $x_1$, instead of the light-emitting diode 82 the light-emitting diode 86 is activated by the activation device 62.

The overhead reading lamp in this case is installed in a passenger service unit 140 that is fastened above the passenger seat 136 to the ceiling of the aircraft cabin. The light-emitting diode 86 emits light in the form of a light cone 142, which strikes the passenger 138, in particular a book (not shown) that he is reading, substantially in the form of a circular surface 144.

Figure 6:
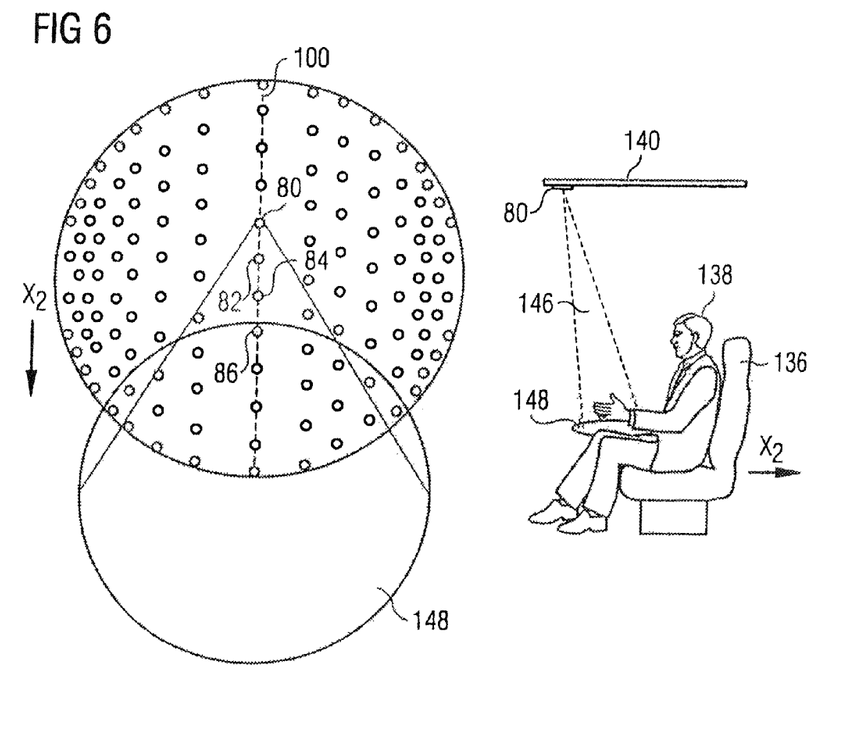
FIG. 6 shows the overhead reading lamp of FIG. 4 in the case of displacement of a passenger seat backward in sitting direction.

FIG. 6 shows a displacement of the passenger seat 136 from the position shown in FIG. 5, in which the light-emitting diode 86 illuminates the passenger seat 136 and/or the passenger 138, in the direction $x_2$, i.e. backwards in sitting direction. Upon a corresponding displacement of the passenger seat 136 in the direction $x_1$, instead of the light-emitting diode 86 the light-emitting diode 80 is activated, which emits light in the form of a light cone 146 that strikes the passenger 138 substantially in the shape of a circular surface 138.

It is thereby guaranteed that enough light, for example to read a book, is always directed in dependence upon the position of the passenger seat 136 towards the passenger 138. The situation whereby the passenger 138 upon a change of the seat position has to stand up and manually realign the overhead reading lamp may consequently be avoided.

Figure 7:
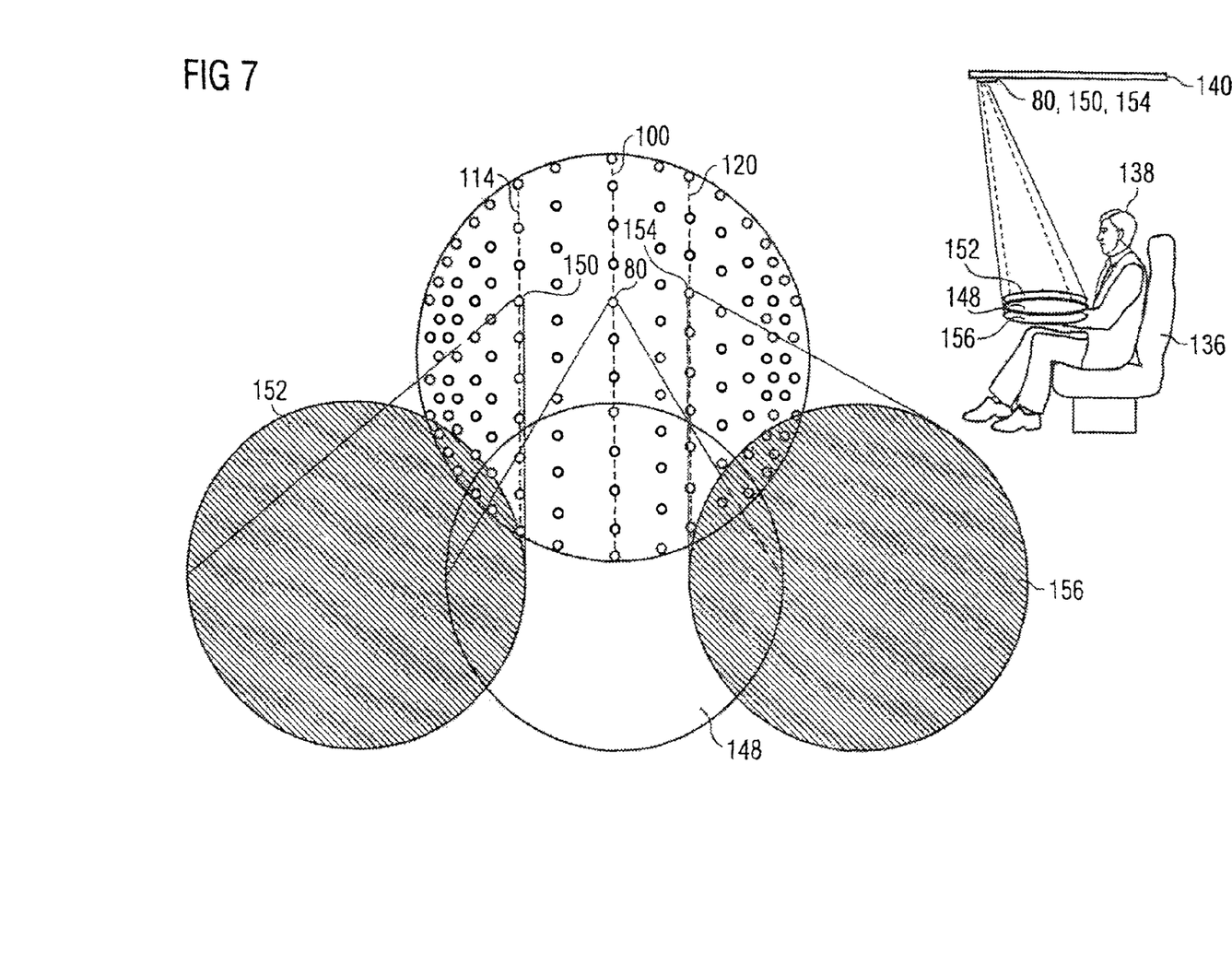
FIG. 7 shows the overhead reading lamp of FIG. 4 with an ambient light.

FIG. 7 shows an inverted plan view of the overhead reading lamp of FIG. 4 with an ambient light.

The overhead reading lamp of FIG. 7 corresponds to the overhead reading lamp of FIG. 4, wherein the light-emitting diodes disposed along the elliptical arcs 114 and 120 emit light of a lower luminous intensity than the light-emitting diodes disposed along the elliptical arc 100. The varied luminous intensities may be realized for example with the aid of a dimmer. The light-emitting diodes disposed along the elliptical arcs 114 and 120 moreover emit light of a different colour, for example red or blue, to that of the light-emitting diodes disposed along the elliptical arc 100. The overhead reading lamp may therefore provide, in addition to a reading lamp function, a pleasant, so-called ambient light.

It is also conceivable for the light-emitting diodes disposed along the elliptical arcs 114 and/or 120 to emit light of the colours red, green and blue, so that by additive RGB colour mixing any desired colour may be produced as ambient light for the passenger seat, in particular as accent light in addition to reading light. The corresponding activation of the light-emitting diodes disposed along the elliptical arcs 114 and/or 120 to produce the desired light colour of the ambient light may be effected with the aid of the activation device 162.

As is evident from FIG. 7, the ambient light emitted by the light-emitting diode 150 strikes the passenger 138 substantially in the form of a circular surface 152 and the ambient light emitted by the light-emitting diode 154 strikes the passenger 138 substantially in the form of a circular surface 156. At the passenger 138 the circular surfaces 152 and 148 and/or 148 and 156 overlap, wherein the light-emitting diodes 150 and 154 illuminate areas laterally alongside the circular surface 148 of the reading light.

In addition to the activation of the light-emitting diodes 150 and 154 that is shown in FIG. 7, further light-emitting diodes that are disposed along the elliptical arcs 114 and/or 120 may additionally be activated by the activation device 162. In this case, the activation device 162 may activate one or more of the light-emitting diodes disposed along the elliptical arcs 114 and 120. It is also conceivable for the activation device 162 to activate only the ambient light and not the reading light, so that only ambient light is produced by the overhead reading lamp.

The present invention has been described by way of embodiments in an aircraft cabin. The present invention is however not restricted to an application in an aircraft cabin. Rather, the overhead reading lamp according to the invention may be used for example also in a train, a bus or a car.

The present invention is moreover not restricted to an automatic adaptation of the activation of the light sources to a position of a passenger seat. The activation of the light sources may alternatively be effected manually by the passenger, for example with the aid of an operator control unit fitted on the passenger seat.

The invention claimed is:

1. An overhead reading lamp for a passenger seat, in particular in an aircraft cabin, comprising
a first plurality of light sources, each of which emits light along a center line,
a holding device, which immovably secures the first plurality of light sources disposed in a first row in such a way that the center lines of the light sources of the first plurality of light sources lie in a first plane and are inclined relative to one another, and
an activation device, which is connected to the first plurality of light sources and devised to selectively activate in each case one of the light sources of the first plurality of light sources,
a second plurality of light sources, each of which emits light along a center line, wherein
the holding device immovably secures the second plurality of light sources disposed in a second row in such a way that the center lines of the light sources of the second plurality of light sources lie in a second plane and are inclined relative to one another, the second row is parallel to the first row, the light sources of the first and the second pluralities of light sources lie on an elliptical paraboloidal surface, and the first and the second planes intersect.

2. The overhead reading lamp according to claim 1, wherein the center lines of each pair of two adjacent light sources of the first plurality of light sources at the light sources are at equal distances from one another and wherein all of the center lines of the first plurality of light sources intersect at one point.

3. The overhead reading lamp according to claim 1, wherein at the light sources the distance between the center lines of each pair of two adjacent light sources of the first plurality of light sources decreases outward from a light source disposed in the middle of the first row and wherein all of the center lines of the first plurality of light sources intersect at one point.

4. The overhead reading lamp according to claim 1, wherein the first row has the shape of a first elliptical arc, the concave side of which faces in the direction of emission of the light source.

5. The overhead reading lamp according to claim 1, wherein the holding device holds the light sources of the first and the second plurality of light sources in such a way on the elliptical paraboloidal surface that the center lines extend substantially normal to the elliptical paraboloidal surface.

6. The overhead reading lamp according to claim 1, wherein the holding device holds a plurality of light sources on more than two parallel parabolas of the elliptical paraboloidal surface, wherein the distances between each pair of two adjacent parabolas decrease outward from a parabola running through a vertex of the elliptical paraboloidal surface.

7. The overhead reading lamp according to claim 1, wherein the activation device is devised to selectively activate one of the light sources in dependence on a position of the passenger seat.

8. The overhead reading lamp according to claim 1, further comprising:
a third plurality of light sources, each of which emits light along a center line,
wherein the holding device immovably secures the third plurality of light sources disposed in a third row in such a way that the center lines of the light sources of the third plurality of light sources lie in a third plane and are inclined relative to one another, wherein the light sources of the first plurality of light sources emit light of a greater luminous intensity than the light sources of the third plurality of light sources and the activation device is devised to activate at least one of the light sources of the third plurality of light sources independently of the selective activation of a light source of the first plurality of light sources.

9. The overhead reading lamp according to claim 1, further comprising:
a cover at a light-emitting side of the lamp, the cover including an outer surface which at least partially emulates the shape of the first row, wherein the cover comprises a plurality of cutouts, in which the light sources of the first plurality of light sources are held by the holding device, and the light sources of the first plurality of light sources comprise light exit surfaces that are at least substantially flush with the outer surface of the cover.

10. The overhead reading lamp according to claim 1, further comprising:
an at least partially transparent cover at a light-emitting side of the lamp, the at least partially transparent cover including an outer surface which at least partially emulates the shape of the first row, wherein the light sources of the first plurality of light sources emit light through the at least partially transparent cover.

11. A passenger service unit, in particular for an aircraft cabin, comprising at least one of the overhead reading lamps according to claim 1.

\* \* \* \* \*